United States Patent

Nakagawa

[11] 4,008,952
[45] Feb. 22, 1977

[54] RETROFOCUS-TYPE LENS SYSTEM
[75] Inventor: Jihei Nakagawa, Higashimurayama, Japan
[73] Assignee: Olympus Optical Co., Ltd., Tokyo, Japan
[22] Filed: July 1, 1975
[21] Appl. No.: 592,267
[30] Foreign Application Priority Data
  July 3, 1974   Japan ................... 49-76054
[52] U.S. Cl. .................................. 350/215
[51] Int. Cl.² ............................ G02B 13/04
[58] Field of Search ................. 350/215, 214
[56] References Cited
UNITED STATES PATENTS

| | | | |
|---|---|---|---|
| 3,506,339 | 4/1970 | Kazamaki | 350/215 |
| 3,507,558 | 4/1970 | Shimizu | 350/215 |
| 3,645,605 | 2/1972 | Nakagawa | 350/214 |

*Primary Examiner*—John K. Corbin
*Assistant Examiner*—Conrad Clark
*Attorney, Agent, or Firm*—Cushman, Darby & Cushman

[57] ABSTRACT

A retrofocus-type lens system of six lens component configuration satisfying the following conditions which is compact in size and for which aberrations are corrected favorably.
1. $0.14f < d_4 < 0.3f$
2. $0.25f < d_5 < 0.5f$
3. $0.4f < d_5 + d_7 < 0.6f$
4. $f < \Sigma d < 1.4f$.

6 Claims, 20 Drawing Figures

SPHERICAL ABERRATION ———
SINE CONDITION ----

ASTIGMATISM

DISTORTION

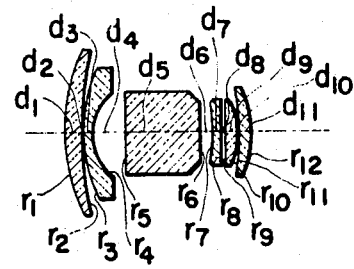
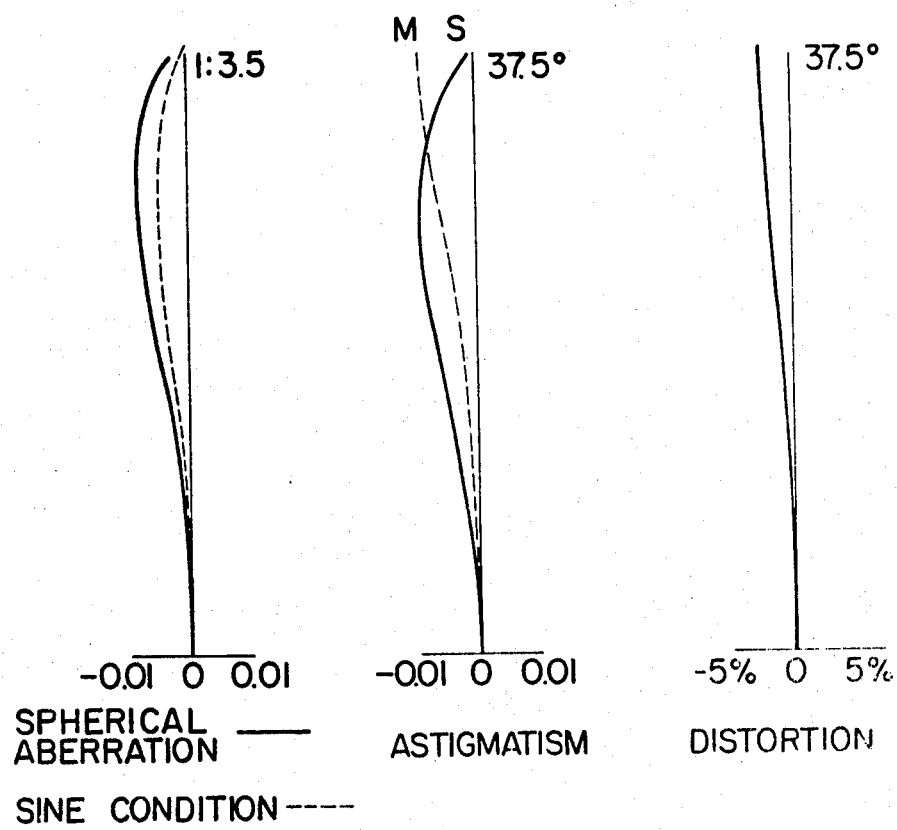

SPHERICAL ABERRATION ———
SINE CONDITION -----

ASTIGMATISM

DISTORTION

SPHERICAL ABERRATION ———
SINE CONDITION ----
ASTIGMATISM
DISTORTION

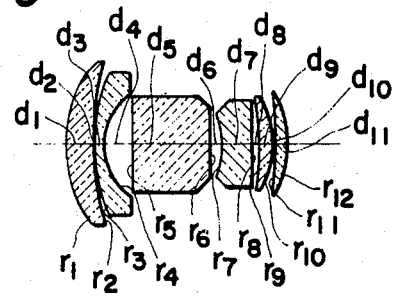
FIG. 9
FIG. 10A
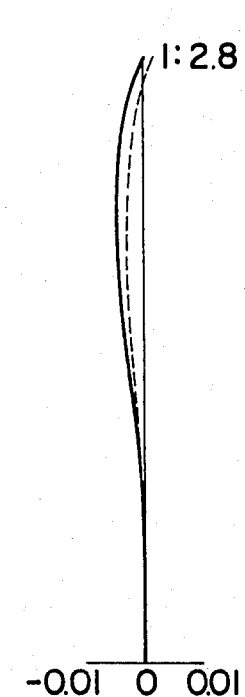
1:2.8
−0.01 0 0.01
SPHERICAL
ABERRATION
SINE CONDITION ----
FIG. 10B
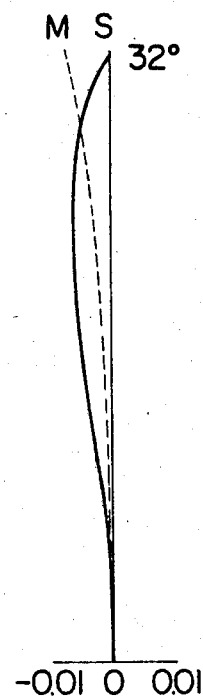
M S  32°
−0.01 0 0.01
ASTIGMATISM
FIG. 10C
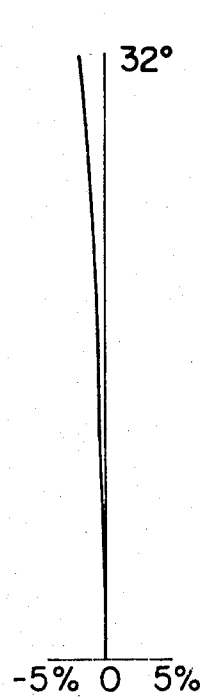
32°
−5% 0 5%
DISTORTION

RETROFOCUS-TYPE LENS SYSTEM

BACKGROUND OF THE INVENTION a. Field of the Invention

The present invention relates to a retrofocus-type lens system for single-lens reflex cameras and, more particularly, to an extremely compact retrofocus-type wide-angle photographic lens system comprising a smaller number of lenses.

b. Description of the Prior Art

As retrofocus-type wide-angle lens systems, those of six lens component configuration are known, for example, as shown in Japanese Pat. Publication No. 26133-1963 in which a first lens component is a positive meniscus lens, a second lens component is a negative meniscus lens, a third lens component is a positive lens of large thickness, a fourth lens component is a negative lens, a fifth lens component is a positive meniscus lens, and a sixth lens component is a positive lens. Known lens systems of the above-mentioned configuration, however, have the following disadvantages. That is, as the airspace between the second and third lens components is large, the lens system as a whole becomes large. Moreover, even when it is tried to design a lens system with still larger aperture or wider field angle, it is impossible to attain a lens system for which aberrations are corrected satisfactorily.

To eliminate the above-mentioned disadvantages, a lens system attained by further developing the above-mentioned lens systems is known as disclosed in Japanese Pat. Publication No. 45015-1972 U.S. Pat. No. 3,832,037). In this lens system, the third lens component, i.e., the positive lens of large thickness in the above-mentioned lens system according to Japanese Pat. Publication No. 26133-1963 is divided into two lenses, i.e., a negative lens and positive lens arranged by providing a slight airspace between each other, and those negative and positive lenses are arranged closer to the second lens component. Thus, the invention according to Japanese Pat. Publication No. 45015-1972 provides an extremely compact retrofocus-type wide-angle lens system for which aberrations are favourably corrected over a wide field angle.

SUMMARY OF THE INVENTION

It is, therefore, a primary object of the present invention to provide a compact retrofocus-type wide-angle lens system comprising a small number of lenses for which aberrations are corrected favourably.

In the lens system according to Japanese Pat. Publication No. 45015-1972, the third lens component consisting of a negative lens and the fourth lens component consisting of a positive lens are arranged by providing a small airspace between each other. In the lens system according to the present invention, however, the air lens (space located between two lenses and functioning as a lens) is eliminated and decrease of aberration correcting ability caused by the above is compensated by adopting a positive lens of large thickness as the third lens component and using the lens system by slightly reducing the field angle.

The lens system according to the present invention is basically arranged as shown in FIG. 1, i.e., it comprises a first lens component which is a positive meniscus lens, a second lens component which is a negative meniscus lens, a third lens component which is a positive lens of large thickness, a fourth lens component which is a negative lens, a fifth lens component which is a positive meniscus lens, and a sixth lens component which is a positive lens and, moreover, satisfies the following conditions.

1. $0.14f < d_4 < 0.3f$
2. $0.25f < d_5 < 0.5f$
3. $0.4f < d_5 + d_7 < 0.6f$
4. $f < \Sigma d < 1.4f$ In the above, reference symbol $f$ represents the focal length of the lens system as a whole, reference symbol $d_4$ represents the airspace between the second and third lens components, reference symbols $d_5$ and $d_7$ respectively represent thicknesses of the third and fourth lens components, and reference symbol $\Sigma d$ represents the distance from the lens surface closest to the object to the lens surface closest to the image plane.

If, in the lens system according to the present invention arranged as described in the above, $d_4$ is made smaller than $0.14f$, it is desirable for making the lens system compact. However, to make the back focal length large, it becomes necessary to make refractive power of the diverging lens group comprising the first and second lenses stronger. If refractive power of the diverging lens group is made stronger, negative distortion increases and, therefore, it is not desirable. If $d_4$ is larger than $0.3f$, refractive power of said diverging lens group can be made weaker and it is advantageous for correction of aberrations. However, the lens system becomes larger and it is not desirable for attaining the object of the present invention.

If $d_5$ is smaller than $0.25f$, it becomes difficult to correct aberrations favourably unless $d_4$ is made larger, i.e., the lens system is made larger. If $d_5$ is larger than $0.5f$, astigmatism will be aggravated and, therefore, it is not desirable.

In relation to selection of $d_5$ defined in the condition (2), proper selection of $d_7$ is essential for favourable correction of curvature of field and astigmatism. The condition (3) is established for this purpose. That is, when $d_5$ is closer to the lower limit of the condition (2), it is necessary to make $d_7$ larger so that $d_5 + d_7$ will fall into the range defined by the condition (3). Otherwise, curvature of field and astigmatism cannot be corrected satisfactorily. If $d_5 + d_7$ is larger than $0.6f$, curvature of field and astigmatism will be overcorrected.

The condition (4), i.e., $f < \Sigma d < 1.4f$ is to define the relation of $d_4$, $d_5$ and $d_7$ to each other and the object of this condition is to make the lens system compact and to correct aberrations favourably. Though values of $d_4$, $d_5$ and $d_7$ may be arbitrarily selected within respective ranges defined by conditions (1), (2) and (3), they must be selected so that they will satisfy the condition $f < \Sigma d < 1.4f$. That is, $\Sigma d$ is the overall length of the lens system and, in the lens system according to the present invention, only $d_4$, $d_5$ and $d_7$ have influence on the overall length $\Sigma d$. The other airspaces and thicknesses of lenses will be practically decided based on effective diameters of respective lenses and limitation in the manufacture. Therefore, the condition (4) is substantially a condition to define the relation of $d_4$, $d_5$ and $d_7$ to each other. If $\Sigma d$ is smaller than $f$, the aperture ratio cannot be made small. If $\Sigma d$ is larger than $1.4f$, the lens system becomes large. Moreover, astigmatism, curvature of field, etc. will be overcorrected, and it becomes very difficult to correct them favourably.

BRIEF DESCRIPTION OF THE DRAWINGS

FIG. 3 shows a sectional view of the Embodiment 2;

FIGS. 4A, 4B and 4C respectively show graphs illustrating aberration curves of the Embodiment 2;

FIG. 9 shows a sectional view of the Embodiment 5; and

FIGS. 10A, 10B and 10C respectively show graphs illustrating aberration curves of the Embodiment 5.

DETAILED DESCRIPTION OF THE PREFERRED EMBODIMENTS

Figure 1:
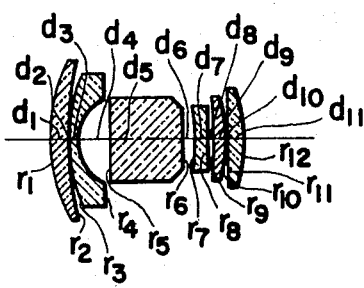
FIG. 1 shows a sectional view of the Embodiment 1 of the lens system according to the present invention.

Preferred embodiments of the retrofocus-type lens system according to the present invention explained in the above are as shown below.

Embodiment 1

$r_1 = 0.86472$
  $d_1 = 0.10683$    $n_1 = 1.7432$    $\nu_1 = 49.4$
$r_2 = 2.23602$
  $d_2 = 0.00351$
$r_3 = 0.87178$
  $d_3 = 0.05271$    $n_2 = 1.51835$   $\nu_2 = 60.3$
$r_4 = 0.26862$
  $d_4 = 0.17184$
$r_5 = 4.84605$
  $d_5 = 0.45051$    $n_3 = 1.80518$   $\nu_3 = 25.4$
$r_6 = -3.54123$
  $d_6 = 0.06993$
$r_7 = -0.87375$
  $d_7 = 0.08082$    $n_4 = 1.84666$   $\nu_4 = 23.9$
$r_8 = 18.86629$
  $d_8 = 0.03268$
$r_9 = -1.61448$
  $d_9 = 0.08645$    $n_5 = 1.618$     $\nu_5 = 63.4$
$r_{10} = -0.51953$
  $d_{10} = 0.00351$
$r_{11} = -5.73146$
  $d_{11} = 0.08012$   $n_6 = 1.618$    $\nu_6 = 63.4$
$r_{12} = -0.60653$
  $f = 1.0,$  $S_{K}\nu = 1.37514,$  $\Sigma d = 1.13891$

Embodiment 2

$r_1 = 0.98629$
  $d_1 = 0.10574$    $n_1 = 1.7432$    $\nu_1 = 49.4$
$r_2 = 2.18620$
  $d_2 = 0.00353$
$r_3 = 0.64888$
  $d_3 = 0.05287$    $n_2 = 1.51835$   $\nu_2 = 60.3$
$r_4 = 0.27280$
  $d_4 = 0.19667$
$r_5 = 8.13576$
  $d_5 = 0.45926$    $n_3 = 1.80518$   $\nu_3 = 25.4$
$r_6 = -2.38235$
  $d_6 = 0.07049$
$r_7 = -0.56679$
  $d_7 = 0.04406$    $n_4 = 1.78472$   $\nu_4 = 25.7$
$r_8 = -115.8307$
  $d_8 = 0.02679$
$r_9 = -2.28218$
  $d_9 = 0.07190$    $n_5 = 1.67$     $\nu_5 = 57.3$
$r_{10} = -0.44600$
  $d_{10} = 0.00353$
$r_{11} = -3.07504$
  $d_{11} = 0.07930$   $n_6 = 1.67$    $\nu_6 = 57.3$
$r_{12} = -0.67634$
  $f = 1.0,$  $S_{K}\nu = 1.31739,$  $\Sigma d = 1.11414$

Embodiment 3

$r_1 = 0.77899$
  $d_1 = 0.10990$    $n_1 = 1.72$     $\nu_1 = 43.7$
$r_2 = 2.21704$
  $d_2 = 0.00351$
$r_3 = 0.99337$
  $d_3 = 0.05263$    $n_2 = 1.51835$   $\nu_2 = 60.3$
$r_4 = 0.25837$
  $d_4 = 0.21618$
$r_5 = 2.37382$
  $d_5 = 0.25923$    $n_3 = 1.78472$   $\nu_3 = 25.7$
$r_6 = -19.16816$
  $d_6 = 0.06070$
$r_7 = -1.31411$
  $d_7 = 0.05263$    $n_4 = 1.78472$   $\nu_4 = 25.7$
$r'_7 = 0.79942$
  $d'_7 = 0.14716$    $n_5 = 1.7859$   $\nu_5 = 44.1$
$r_8 = 9.96285$
  $d_8 = 0.01898$
$r_9 = -1.94162$
  $d_9 = 0.08362$    $n_6 = 1.67$     $\nu_6 = 57.3$
$r_{10} = -0.45292$
  $d_{10} = 0.00351$
$r_{11} = -3.10087$
  $d_{11} = 0.07274$   $n_7 = 1.67$    $\nu_7 = 57.3$
$r_{12} = -1.06628$
  $f = 1.0,$  $S_{K}\nu = 1.31587,$  $\Sigma d = 1.08079$

Embodiment 4

$r_1 = 0.78816$
  $d_1 = 0.20003$    $n_1 = 1.72$     $\nu_1 = 50.3$
$r_2 = 2.12468$
  $d_2 = 0.00400$
$r_3 = 0.98386$
  $d_3 = 0.05715$    $n_2 = 1.51835$   $\nu_2 = 60.3$
$r_4 = 0.36128$
  $d_4 = 0.28096$
$r_5 = 2.69252$
  $d_5 = 0.27296$    $n_3 = 1.8061$   $\nu_3 = 40.9$
$r_6 = -4.93715$
  $d_6 = 0.08567$
$r_7 = -0.52950$
  $d_7 = 0.27462$    $n_4 = 1.78472$   $\nu_4 = 25.7$
$r_8 = 4.55068$
  $d_8 = 0.01938$
$r_9 = -16.67865$
  $d_9 = 0.09939$    $n_5 = 1.713$    $\nu_5 = 53.9$
$r_{10} = -0.59009$
  $d_{10} = 0.00286$
$r_{11} = 3.19140$
  $d_{11} = 0.08344$   $n_6 = 1.713$   $\nu_6 = 53.9$
$r_{12} = -1.19632$
  $f = 1.0,$  $S_{K}\nu = 1.07463,$  $\Sigma d = 1.38046$

Embodiment 5

$r_1 = 0.54727$
  $d_1 = 0.11265$    $n_1 = 1.7432$    $\nu_1 = 49.4$
$r_2 = 1.42131$
  $d_2 = 0.00282$
$r_3 = 0.62407$
  $d_3 = 0.04224$    $n_2 = 1.51454$   $\nu_2 = 54.7$
$r_4 = 0.27143$
  $d_4 = 0.14335$
$r_5 = -7.49458$
  $d_5 = 0.37287$    $n_3 = 1.80518$   $\nu_3 = 25.4$
$r_6 = -1.25726$
  $d_6 = 0.05604$
$r_7 = -0.36042$
  $d_7 = 0.13997$    $n_4 = 1.80518$   $\nu_4 = 25.4$
$r_8 = -4.60381$
  $d_8 = 0.02619$
$r_9 = -1.18720$
  $d_9 = 0.06928$    $n_5 = 1.63854$   $\nu_5 = 55.4$
$r_{10} = -0.40325$
  $d_{10} = 0.00282$
$r_{11} = 37.32366$
  $d_{11} = 0.06421$   $n_6 = 1.63854$  $\nu_6 = 55.4$
$r_{12} = -0.63641$
  $f = 1.0,$  $S_{K}\nu = 1.08719,$  $\Sigma d = 1.03244$ In the above-mentioned respective embodiments, reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses, reference symbols, $\nu_1$ through $\nu_6$ respectively represent Abbe's numbers of respective lenses, reference symbol $f$ represents the focal length of the lens system as a whole, reference symbol $S_{k}\nu$ represents the back focal length and reference symbol $\Sigma d$ represents the overall length of the lens system.

Figure 2A:
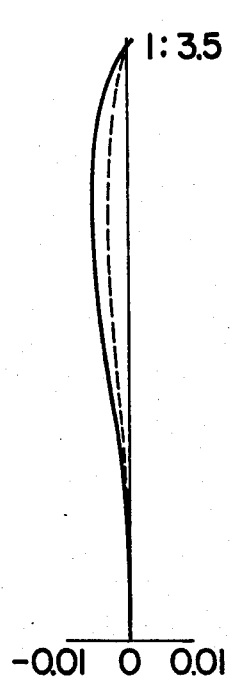
FIGS. 2A, 2B and 2C respectively show graphs illustrating aberration curves of the Embodiment 1.
Figure 2B:
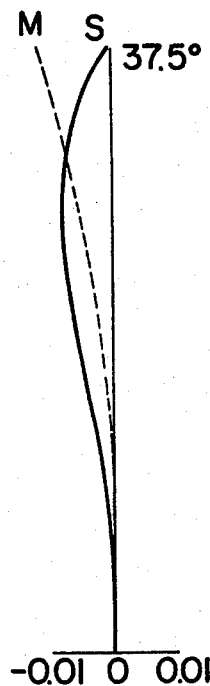
Figure 2C:
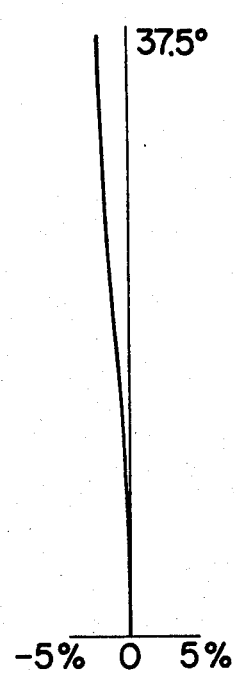
Figure 5:
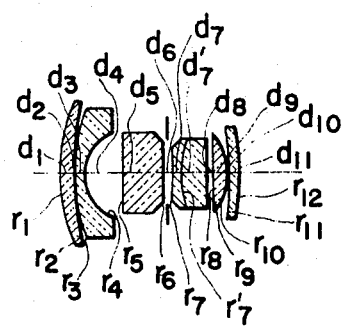
FIG. 5 shows a sectional view of the Embodiment 3.
Figure 6A:
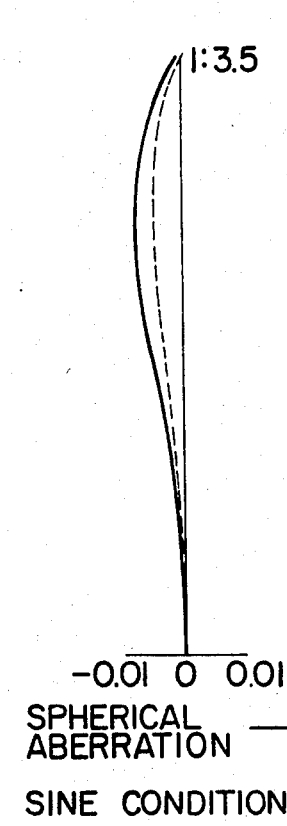
FIGS. 6A, 6B and 6C respectively show graphs illustrating aberration curves of the Embodiment 3.
Figure 6B:
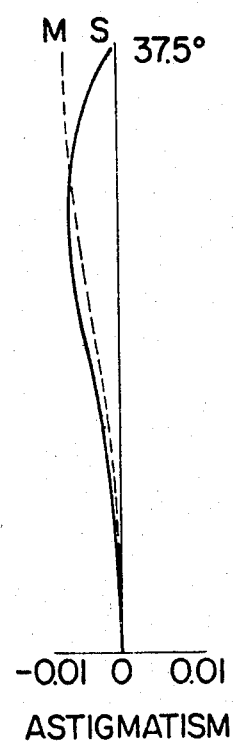
Figure 6C:
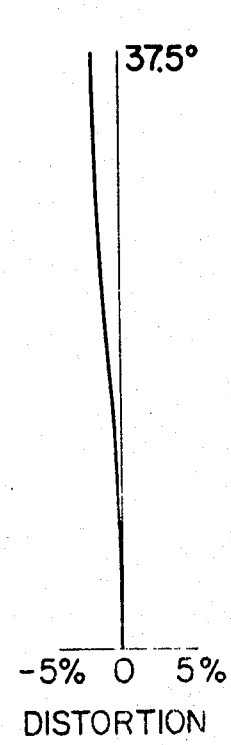
Figure 7:
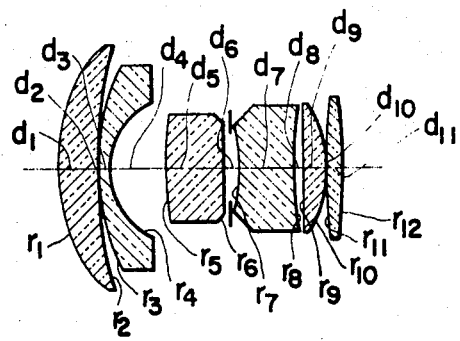
FIG. 7 shows a sectional view of the Embodiment 4.
Figures 8A, 8B, 8C:
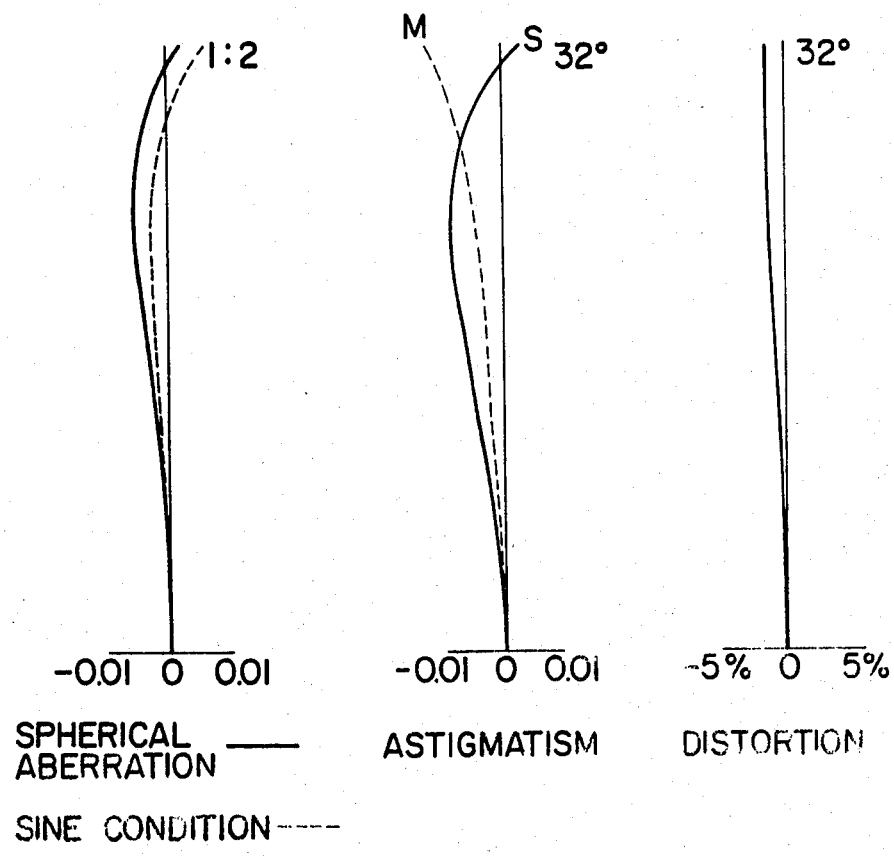
FIGS. 8A, 8B and 8C respectively show graphs illustrating aberration curves of the Embodiment 4.

In the above-mentioned respective embodiments, the Embodiment 1 corresponds to the lens system shown in FIG. 1 and its aberrations are as shown in FIGS. 2A, 2B and 2C. The Embodiment 2 corresponds to the lens system shown in FIG. 3 and its aberrations are as shown in FIGS. 4A, 4B and 4C. The Embodiment 3 is arranged as shown in FIG. 5 and a cemented negative doublet lens is used as the negative lens which constitutes the fourth lens component. Therefore, in the Embodiment 3, the sum of $d_7$ and $d'_7$ corresponds to $d_7$ in the condition (3). Consequently, the condition (3) can be expressed as $0.4f < d_5 + d_7 + d'_7 < 0.6f$. Aberration curves of the Embodiment 3 are shown in FIG. 6A, 6B and 6C. Embodiments 4 and 5 respectively corresponds to lens systems shown in FIG. 7 and FIG. 9. Their aberration curves are respectively shown in FIGS. 8A, 8B and 8C and FIGS. 10A, 10B and 10C. As it is evident from graphs of aberration curves of respective embodiments, aberrations of the lens system according to the present invention are corrected quite favourably.

I claim:

1. A retrofocus-type lens system comprising a first, second, third, fourth, fifth and sixth lens components, said first lens component being a positive meniscus lens, said second lens component being a negative meniscus lens, said third lens component being a positive lens of large thickness, said fourth lens component being a negative lens, said fifth lens component being a positive meniscus lens, and said sixth lens component being a positive lens, said retrofocus-type lens system satisfying the following conditions:

1. $0.14f < d_4 < 0.3f$
   2. $0.25f < d_5 < 0.5f$
   3. $0.4f < d_5 + d_7 < 0.6f$
   4. $f < \Sigma d < 1.4f$ wherein reference symbol $f$ represents the focal length of the lens system as a whole, reference symbol $d_4$ represents the airspace between the second and third lens components, reference symbols $d_5$ and $d_7$ respectively represents thicknesses of the third and fourth lens components, and reference symbol $\Sigma d$ represents the overall length of the lens system.

2. A retrofocus-type lens system comprising a first, second, third, fourth, fifth and sixth lens components, said first lens component being a positive meniscus lens, said second lens component being a negative meniscus lens, said third lens component being a positive lens of large thickness, said fourth lens component being a negative lens, said fifth lens component being a positive meniscus lens, and said sixth lens component being a positive lens, said retrofocus-type lens system having numerical values as given below:

| | | | |
|---|---|---|---|
| $r_1 = 0.86472$ | | | |
| | $d_1 = 0.10683$ | $n_1 = 1.7432$ | $\nu_1 = 49.4$ |
| $r_2 = 2.23602$ | | | |
| | $d_2 = 0.00351$ | | |
| $r_3 = 0.87178$ | | | |
| | $d_3 = 0.05271$ | $n_2 = 1.51835$ | $\nu_2 = 60.3$ |
| $r_4 = 0.26862$ | | | |
| | $d_4 = 0.17184$ | | |
| $r_5 = 4.84605$ | | | |
| | $d_5 = 0.45051$ | $n_3 = 1.80518$ | $\nu_3 = 25.4$ |
| $r_6 = -3.54123$ | | | |
| | $d_6 = 0.06993$ | | |
| $r_7 = -0.87375$ | | | |
| | $d_7 = 0.08082$ | $n_4 = 1.84666$ | $\nu_4 = 23.9$ |
| $r_8 = 18.86629$ | | | |

-continued

| | | | |
|---|---|---|---|
| | $d_8 = 0.03268$ | | |
| $r_9 = -1.61448$ | | | |
| | $d_9 = 0.08645$ | $n_5 = 1.618$ | $\nu_5 = 63.4$ |
| $r_{10} = -0.51953$ | | | |
| | $d_{10} = 0.00351$ | | |
| $r_{11} = -5.73146$ | | | |
| | $d_{11} = 0.08012$ | $n_6 = 1.618$ | $\nu_6 = 63.4$ |
| $r_{12} = -0.60653$ | | | |
| $f = 1.0$, $S_{K\nu} = 1.37514$, | | $\Sigma d = 1.13891$ | | wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol $f$ represents the focal length of the lens system as a whole, reference symbol $S_{K\nu}$ represents the back focal length and reference symbol $\Sigma d$ represents the overall length of the lens system.

3. A retrofocus-type lens system comprising a first, second, third, fourth, fifth and sixth lens components, said first lens component being a positive meniscus lens, said second lens component being a negative meniscus lens, said third lens component being a positive lens of large thickness, said fourth lens component being a negative lens, said fifth lens component being a positive meniscus lens, and said sixth lens component being a positive lens, said retrofocus-type lens system having numerical values as given below:

| | | | |
|---|---|---|---|
| $r_1 = 0.98629$ | | | |
| | $d_1 = 0.10574$ | $n_1 = 1.7432$ | $\nu_1 = 49.4$ |
| $r_2 = 2.18620$ | | | |
| | $d_2 = 0.00353$ | | |
| $r_3 = 0.64888$ | | | |
| | $d_3 = 0.05287$ | $n_2 = 1.51835$ | $\nu_2 = 60.3$ |
| $r_4 = 0.27280$ | | | |
| | $d_4 = 0.19667$ | | |
| $r_5 = 8.13576$ | | | |
| | $d_5 = 0.45926$ | $n_3 = 1.80518$ | $\nu_3 = 25.4$ |
| $r_6 = -2.38235$ | | | |
| | $d_6 = 0.07049$ | | |
| $r_7 = -0.56679$ | | | |
| | $d_7 = 0.04406$ | $n_4 = 1.78472$ | $\nu_4 = 25.7$ |
| $r_8 = -115.8307$ | | | |
| | $d_8 = 0.02679$ | | |
| $r_9 = -2.28218$ | | | |
| | $d_9 = 0.07190$ | $n_5 = 1.67$ | $\nu_5 = 57.3$ |
| $r_{10} = -0.44600$ | | | |
| | $d_{10} = 0.00353$ | | |
| $r_{11} = -3.07504$ | | | |
| | $d_{11} = 0.07930$ | $n_6 = 1.67$ | $\nu_6 = 57.3$ |
| $r_{12} = -0.67634$ | | | |
| $f = 1.0$, $S_{K\nu} = 1.31739$, | | $\Sigma d = 1.11414$ | | wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol $f$ represents the focal length of the lens system as a whole, reference symbol $S_{K\nu}$ represents the back focal length and reference symbol $\Sigma d$ represents the overall length of the lens system.

4. A retrofocus-type lens system comprising a first, second, third, fourth, fifth and sixth lens components, said first lens component being a positive meniscus lens, said second lens component being a negative meniscus lens, said third lens component being a positive lens of large thickness, said fourth lens component being a negative lens, said fifth lens component being a positive meniscus lens, and said sixth lens component being a positive lens, said retrofocus-type lens system having numerical values as given below:

$r_1 = 0.77899$
    $d_1 = 0.10990$    $n_1 = 1.72$    $\nu_1 = 43.7$
$r_2 = 2.21704$
    $d_2 = 0.00351$
$r_3 = 0.99337$
    $d_3 = 0.05263$    $n_2 = 1.51835$    $\nu_2 = 60.3$
$r_4 = 0.25837$
    $d_4 = 0.21618$
$r_5 = 2.37382$
    $d_5 = 0.25923$    $n_3 = 1.78472$    $\nu_3 = 25.7$
$r_6 = -19.16816$
    $d_6 = 0.06070$
$r_7 = -1.31411$
    $d_7 = 0.05263$    $n_4 = 1.78472$    $\nu_4 = 25.7$
$r'_7 = 0.79942$
    $d'_7 = 0.14716$    $n_5 = 1.7859$    $\nu_5 = 44.1$
$r_8 = 9.96285$
    $d_8 = 0.01898$
$r_9 = -1.94162$
    $d_9 = 0.08362$    $n_6 = 1.67$    $\nu_6 = 57.3$
$r_{10} = -0.45292$
    $d_{10} = 0.00351$
$r_{11} = -3.10087$
    $d_{11} = 0.07274$    $n_7 = 1.67$    $\nu_7 = 57.3$
$r_{12} = -1.06628$
    $f = 1.0$, $S_{K\nu} = 1.31587$,    $\Sigma d = 1.08079$ wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_7$ respectively represent refractive indices of respective lenses, reference symbols $\nu_1$ through $\nu_7$ respectively represent Abbe's numbers of respective lenses, reference symbol $f$ represents the focal length of the lens system as a whole, reference symbol $S_{K\nu}$ represents the back focal length and reference symbol $\Sigma d$ represents the overall length of the lens system.

5. A retrofocus-type lens system comprising a first, second, third, fourth, fifth and sixth lens components, said first lens component being a positive meniscus lens, said second lens component being a negative meniscus lens, said third lens component being a positive lens of large thickness, said fourth lens component being a negative lens, said fifth lens component being a positive meniscus lens, and said sixth lens component being a positive lens, said retrofocus-type lens system having numerical values as given below:

$r_1 = 0.78816$
    $d_1 = 0.20003$    $n_1 = 1.72$    $\nu_1 = 50.3$
$r_2 = 2.12468$
    $d_2 = 0.00400$
$r_3 = 0.98386$
    $d_3 = 0.05715$    $n_2 = 1.51835$    $\nu_2 = 60.3$
$r_4 = 0.36128$
    $d_4 = 0.28096$
$r_5 = 2.69252$
    $d_5 = 0.27296$    $n_3 = 1.8061$    $\nu_3 = 40.9$
$r_6 = -4.93715$
    $d_6 = 0.08567$
$r_7 = -0.52950$
    $d_7 = 0.27462$    $n_4 = 1.78472$    $\nu_4 = 25.7$
$r_8 = 4.55068$
    $d_8 = 0.01938$
$r_9 = -16.67865$
    $d_9 = 0.09939$    $n_5 = 1.713$    $\nu_5 = 53.9$
$r_{10} = -0.59009$
    $d_{10} = 0.00286$
$r_{11} = 3.19140$
    $d_{11} = 0.08344$    $n_6 = 1.713$    $\nu_6 = 53.9$
$r_{12} = -1.19632$
    $f = 1.0$, $S_{K\nu} = 1.07463$,    $\Sigma d = 1.38046$ wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol $f$ represents the focal length of the lens system as a whole, reference symbol $S_{K\nu}$ represents the back focal length and reference symbol $\Sigma d$ represents the overall length of the lens system.

6. A retrofocus-type lens system comprising a first, second, third, fourth, fifth and sixth lens components, said first lens component being a positive meniscus lens, said second lens component being a negative meniscus lens, said third lens component being a positive lens of large thickness, said fourth lens component being a negative lens, said fifth lens component being a positive meniscus lens, and said sixth lens component being a positive lens, said retrofocus-type lens system having numerical values as given below:

$r_1 = 0.54727$
    $d_1 = 0.11265$    $n_1 = 1.7432$    $\nu_1 = 49.4$
$r_2 = 1.42131$
    $d_2 = 0.00282$
$r_3 = 0.62407$
    $d_3 = 0.04224$    $n_2 = 1.51454$    $\nu_2 = 54.7$
$r_4 = 0.27143$
    $d_4 = 0.14335$
$r_5 = -7.49458$
    $d_5 = 0.37287$    $n_3 = 1.80518$    $\nu_3 = 25.4$
$r_6 = -1.25726$
    $d_6 = 0.05604$
$r_7 = -0.36042$
    $d_7 = 0.13997$    $n_4 = 1.80518$    $\nu_4 = 25.4$
$r_8 = -4.60381$
    $d_8 = 0.02619$
$r_9 = -1.18720$
    $d_9 = 0.06928$    $n_5 = 1.63854$    $\nu_5 = 55.4$
$r_{10} = -0.40325$
    $d_{10} = 0.00282$
$r_{11} = 37.32366$
    $d_{11} = 0.06421$    $n_6 = 1.63854$    $\nu_6 = 55.4$
$r_{12} = -0.63641$
    $f = 1.0$, $S_{K\nu} = 1.08719$,    $\Sigma d = 1.03244$ wherein reference symbols $r_1$ through $r_{12}$ respectively represent radii of curvature of respective surfaces of respective lenses, reference symbols $d_1$ through $d_{11}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol $f$ represents the focal length of the lens system as a whole, reference symbol $S_{K\nu}$ represents the back focal length and reference symbol $\Sigma d$ represents the overall length of the lens system.

* * * * *